March 10, 1953 — L. V. GUILD — 2,631,088
APPARATUS FOR MAKING GAS ANALYSES
Filed April 22, 1947
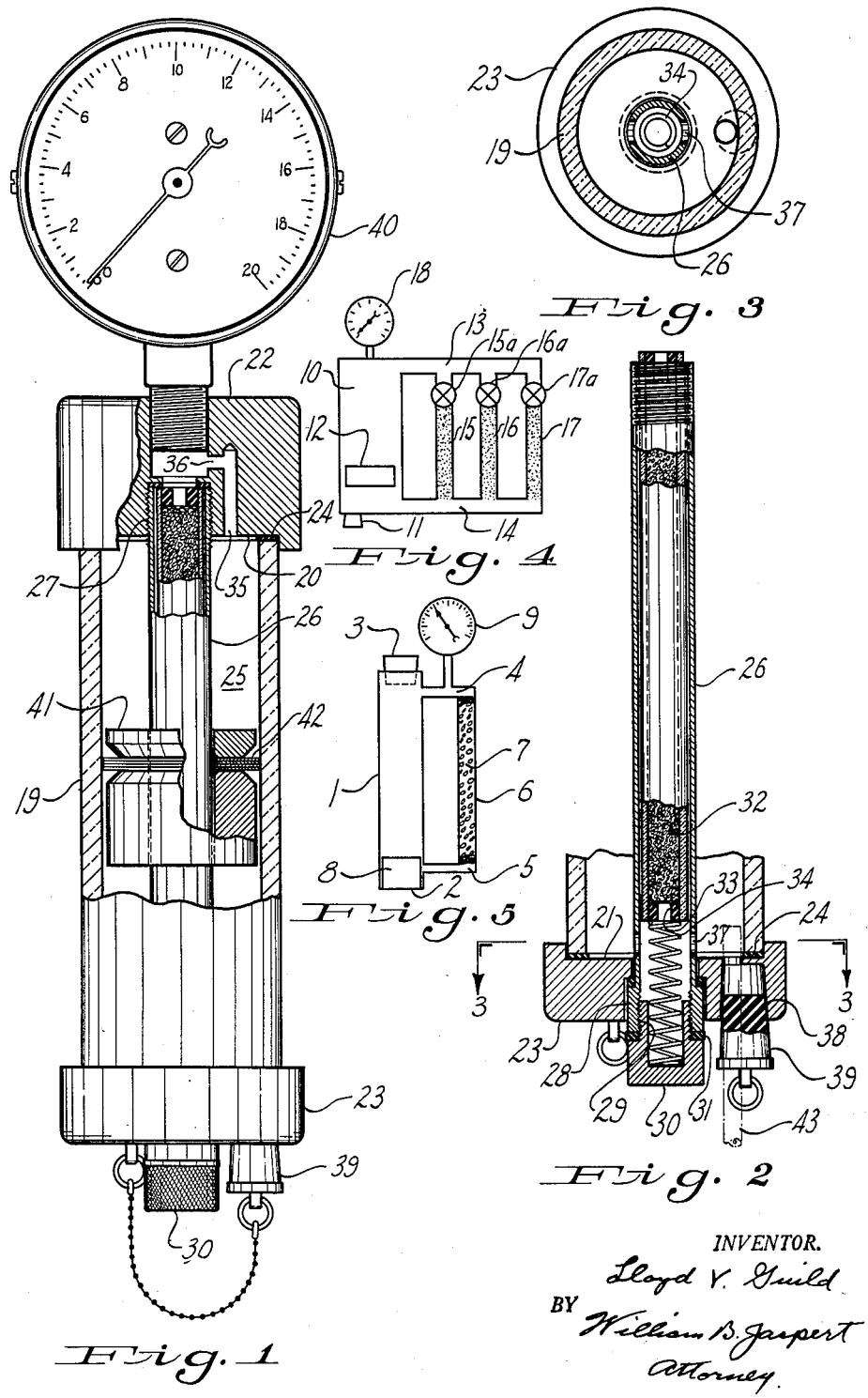
INVENTOR.
Lloyd V. Guild
BY William B. Jaspert
Attorney Patented Mar. 10, 1953

2,631,088

UNITED STATES PATENT OFFICE 2,631,088

APPARATUS FOR MAKING GAS ANALYSES

Lloyd V. Guild, Pittsburgh, Pa.

Application April 22, 1947, Serial No. 743,003

1 Claim. (Cl. 23—254)

This invention relates to apparatus for making gas analyses of chemical and industrial processes, and it is among the objects thereof to provide a simple inexpensive gas analyzer which shall give the analysis of a single gas constituent with sufficient accuracy for most control purposes and without the need of operating skill.

The invention is particularly adapted for use in boiler plant and furnace operation to make a ready off-hand analysis of the principal constituent, such as carbon dioxide, carbon monoxide, oxygen and nitrogen, which, if any one is known, gives an index of the efficiency of the operation because these principal constituents bear definite relations to one another.

The invention will become more apparent from a consideration of the accompanying drawing, constituting a part hereof, in which like reference characters designate like parts, and in which:

Fig. 1 is a side elevational view, partially in cross section, of a gas analyzer embodying the principles of this invention;

Fig. 2 a vertical cross sectional view of the gas analyzer shown in Fig. 1 with parts broken away to illustrate a central housing for the chemical tube;

Fig. 3 a cross sectional view taken along the line 3—3, Fig. 2;

Fig. 4 a front elevational view diagrammatically illustrating a manifold type gas analyzer for analyzing multiple constituents of a gas; and Fig. 5 a side elevational view diagrammatically illustrating a modified form of gas analyzer.

With reference to Fig. 5 of the drawing, the structure comprises a cylinder 1 closed at the end 2 and having a removable stopper 3 at the opposite end, the cylinder 1 being connected by passages 4 and 5 with a tube 6 containing chemicals 7 capable of absorbing a constituent of the gas. The chemical, which is a solid absorbent, is so chosen that it will chemically remove the constituent required in the analysis. It may consist of such well known materials as potassium hydroxide for carbon dioxide, phosphorus for oxygen, etc. Such absorbents, either in pellet form or on a carrier, are well known in the art and are not part of this invention.

Disposed in the cylinder 1 is a piston 8 and mounted above the passage 4 is a pressure gauge 9. If it is desired to analyze flue gases, for example, for carbon dioxide, tube 6 is filled with potassium hydroxide. The stopper 3 is removed from cylinder 1 and the cylinder is charged with the flue gas as by means of a hand pump such as a bulb on a rubber tube. The stopper 3 is then replaced and the gas analyzer is inverted so that the plunger 8 is at the top of cylinder 1. As the plunger drops it will displace the gas from the cylinder 1 through the passage 4 into the chemical tube 6 through which it passes to passage 5 and back into the cylinder 1. While contacting the potassium hydroxide the carbon dioxide will be absorbed, and as this reaction occurs the volume of the gas in the cylinder 1 and its connected passages is subjected to a pressure decrease which is registered on the gauge 9. The decrease in pressure is directly proportional to the percentage of the gas removed and the gauge can be calibrated in graduations of percentage of the constituent desired and the analysis effected.

In the form of the device diagrammatically illustrated in Fig. 4, the numeral 10 designates the charging cylinder, 11 the stopper, 12 the piston, 13 and 14 passages connected in the ends of chemical tubes 15, 16 and 17 having valves 15a, 16a and 17a respectively, and a pressure gauge 18. The device functions similar to that described in connection with Fig. 5 except that a multiple of absorbents may be employed for each absorbing one of the constituents of a gas by passing the gas successively through any of the absorbent tubes which is exposed to the pumping action of piston 12 by opening of the valve of the particular tube. By noting the pressure readings on the gauge 18 as the gases have been driven through each of the absorbent materials, the amount of the constituent that has reacted with the absorbent chemical may be thus determined.

The device of Fig. 5 has been designed to be of more practical commercial use in the form shown in Figs. 1, 2 and 3, in which the numeral 19 designates a glass or plastic cylinder, the ends of which are seated in recesses 20 and 21, respectively, of end caps 22 and 23, resilient gaskets 24 being employed to seal the inner chamber 25 of the cylinder 19. Mounted in the end members 22 and 23 is a metal tube 26 having a threaded end 27 which interacts with the thread of the end member 22, and having an enlarged end 28 with an inner thread that interacts with the thread 29 of an end cap 30, gasket 31 sealing the joint between the end of the tube 26 and the cap 30. A glass tube 32 containing a solid absorbent such as potassium hydroxide is disposed in the metal tube 26. It is provided with rubber ferrules 33 that are perforated to constitute the absorbent tube an open-ended member for the free passage of gases therethrough. The tube 32 is mounted in the metal tube 26 by supporting it on a coil spring 34 so that it does not move axially when the gas analyzer is manipulated in the manner hereinafter explained. As shown in Fig. 1 the chamber 25 of the cylinder 19 is provided with a passage 35 which communicates through a port 36 with a bore in the center of the end member 22. The lower end of the metal tube 26 is provided with a port or opening 37 and the end member 23 is provided with an opening 38 for receiving a stopper 39. A pressure gauge 40 is mounted on the end member 22 as shown in Fig. 1, and a piston 41 having a sliding fit on the metal tube 26 is disposed within the cylinder 19. A piston leader 42 is provided to engage the wall of the cylinder 19.

In operation stopper 39 is removed when the cylinder 19 is inverted from the position shown in Fig. 1, and the gas to be analyzed is supplied through a tube 43, Fig. 2, that is inserted through the opening 38. When chamber 25 has been charged with a sample of the gas, tube 43 is removed and stopper 39 is replaced, leaving the gas sealed in the chamber 25. The device is then inverted to the position shown in Fig. 1, causing the heavy piston 41 to travel from end to end of the cylinder 19 to displace the sample gas through passage 37 into the tube 26 wherein it passes through the absorbent material and back through passages 36 and 35 into the chamber 25. The constituent of the gas to be measured chemically reacts with the absorbent, reducing the pressure which is indicated on the gauge 40. By proper calibration the pressure gauge indicates the volume of the constituent of the gas being measured. By reverting and inverting the analyzer the piston 41 can be made to travel back and forth to recirculate the sample of the gas through the absorbent until all of the constituent to be measured has reacted with the absorbent material.

The device is capable of analyzing one constituent of a gas sample rapidly and with a fair degree of accuracy satisfactory for most control purposes. It is especially suited for routine determination of constituents of gases by persons unskilled in the art of gas analyses. An analysis may be made in about one minute. It is of light weight and easily portable. It employs no valves that may leak and cause erroneous results. Approximately one hundred determinations may be made without changing the chemical absorbent, and when worn out the absorbent tube may be replaced in a matter of seconds by removing the end cap 30.

Although several embodiments of the invention have been herein illustrated and described, it will be evident to those skilled in the art that various modifications may be made in the details of construction without departing from the principles herein set forth.

I claim:

A gas analyzer comprising a closed cylinder, a tube concentrically mounted within said cylinder, the ends of said tube communicating with the annular chamber defined by the interior walls of said cylinder and the exterior wall of said tube, said tube adapted to contain an absorbent material, a ring shaped piston mounted for sliding movement on said tube having rings for sealing the annular chamber on opposite sides of the piston whereby movement of the piston causes displacement of the gas in said chamber through said tube, said cylinder having a pressure gauge connected at one end and having a charging opening at the opposite end with means for sealing said opening when the cylinder is charged with gas, said gas analyzer being operable by tilting the cylinder to cause movement of the piston for displacing the sample gas from the annular cylinder chamber through the absorbent material to effect a decrease in pressure which is registered on the gauge.

LLOYD V. GUILD.

REFERENCES CITED

The following references are of record in the file of this patent:

UNITED STATES PATENTS

| Number | Name | Date |
|---|---|---|
| 970,923 | Hinman | Sept. 20, 1910 |
| 1,023,188 | Wilson | Apr. 16, 1912 |
| 1,282,409 | Gilbert | Oct. 22, 1918 |
| 1,285,927 | Butches | Nov. 26, 1918 |
| 1,671,795 | Terhune | May 29, 1928 |
| 1,930,192 | Cunningham | Oct. 10, 1933 |
| 2,026,842 | Matuszak | Jan. 7, 1936 |
| 2,181,013 | Dwyer | Nov. 21, 1939 |

FOREIGN PATENTS

| Number | Country | Date |
|---|---|---|
| 342,949 | Great Britain | Feb. 12, 1931 |
| 343,724 | Great Britain | Feb. 26, 1931 |
| 419,047 | Great Britain | Nov. 5, 1934 |
| 433,979 | Great Britain | Aug. 23, 1935 |
| 543,160 | Great Britain | Feb. 12, 1942 |